INVENTORS
CHARLES W. SPALDING
WALTER H. WEST
BRYAN E. NIXON
BY
ATTORNEY

Oct. 18, 1960 C. W. SPALDING ET AL 2,956,405
POWER SYSTEM
Filed April 4, 1957 3 Sheets-Sheet 2

INVENTORS
CHARLES W. SPALDING
WALTER H. WEST
BY BRYAN E. NIXON

D. C. Staley
ATTORNEY

Oct. 18, 1960  C. W. SPALDING ET AL  2,956,405
POWER SYSTEM
Filed April 4, 1957  3 Sheets-Sheet 3
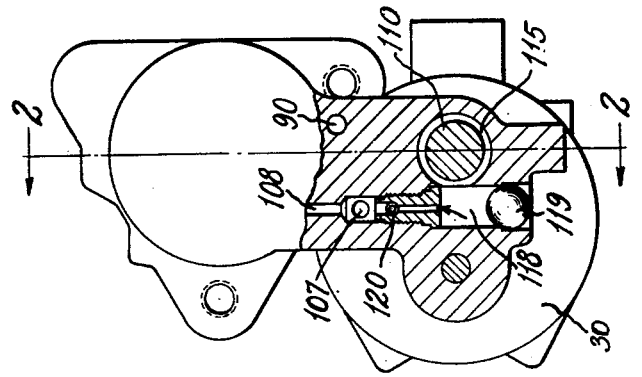
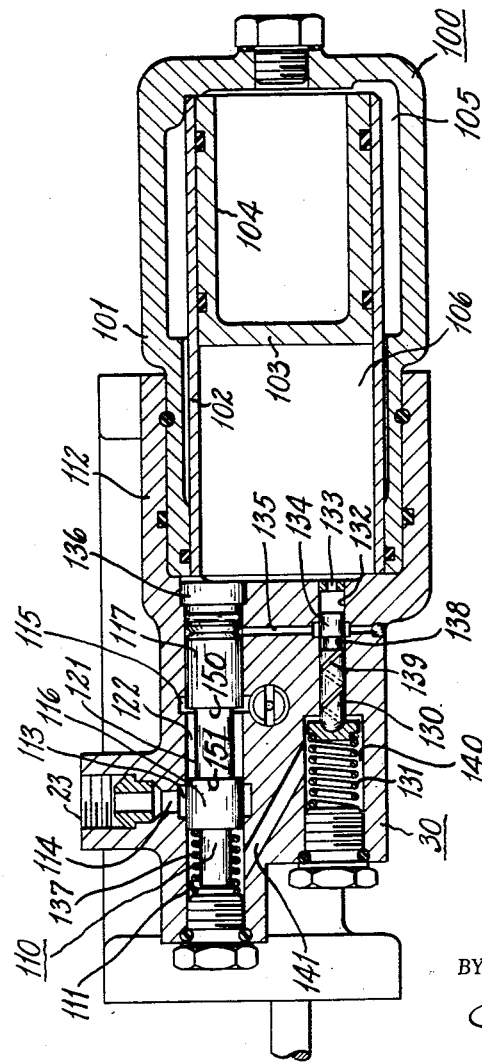
INVENTORS
CHARLES W. SPALDING
WALTER H. WEST
BY BRYAN E. NIXON
ATTORNEY

United States Patent Office 2,956,405
Patented Oct. 18, 1960

2,956,405

POWER SYSTEM

Charles W. Spalding, Saginaw, and Walter H. West, Bay City, Mich., and Bryan E. Nixon, Glendale, Ariz., assignors to General Motors Corporation, Detroit, Mich., a corporation of Delaware Filed Apr. 4, 1957, Ser. No. 650,656

5 Claims. (Cl. 60—51)

This invention relates to a hydraulic power operating system for the steering mechanism and brakes of a vehicle.

It is current practice in motor vehicles to provide power operation of the steering mechanism of the vehicle and also provide power operation of the brakes for the motor vehicle. It has been common to utilize a hydraulic system for power actuation of the steering mechanism and to use a pressure differential motor for power actuation of the brakes of the vehicle wherein the pressure differential motor is adapted for connection with the manifold of the engine of the vehicle as a source of vacuum to evacuate one side of the pressure differential motor and thereby provide for a power actuation of the brakes of the vehicle, the evacuation of the pressure differential motor being under control of the manually operated valve mechanism that is connected with the brake pedal of the vehicle.

In this invention there is provided a hydraulic system that is adapted to effect power operation of the steering mechanism of the motor vehicle and also effect power actuation of the brakes of the vehicle.

The power operated steering mechanism of the vehicle may conventionally consist of a flow control valve for regulating flow of hydraulic fluid under pressure to either of opposite ends of a hydraulic motor that is connected mechanically with the steering mechanism of the vehicle to provide for power operation of the steering mechanism. The power mechanism for the brakes of the vehicle may consist of a conventional master cylinder comprising a fluid displacement member operating within a cylinder to effect displacement of hydraulic fluid under pressure into the wheel cylinders of hydraulically operated brakes, the fluid displacement member of the master cylinder being adapted for power actuation of a fluid motor that receives hydraulic fluid under pressure from a hydraulic pressure accumulator that is continuously in hydraulic connection with the fluid motor for power actuation of the brakes. The pressure accumulator is also adapted for connection with the hydraulic fluid pressure source that provides hydraulic fluid under pressure for power operating the steering mechanism so that the pressure accumulator can be charged and recharged with hydraulic fluid under pressure from the same hydraulic pressure source that provides fluid under pressure for operation of the steering control.

In this invention there is also provided a pressure accumulator charging valve that is located in the hydraulic system between the source of hydraulic pressure fluid and the steering control valve and the pressure accumulator, the charging valve being adapted in one position of operation to provide for direction of hydraulic fluid under pressure from the source into the pressure accumulator to charge the pressure accumulator to a predetermined pressure, and at the same time provide for delivery of hydraulic fluid under pressure to the fluid motor that power operates the brakes of the vehicle. In this first position of operation the charging valve is also adapted to direct a sufficient volume of hydraulic fluid under pressure to the steering control valve during the charging of the pressure accumulator so that hydraulic pressure fluid is available at the steering control valve to maintain full control of power operation of the steering mechanism.

The charging valve is also adapted to have a second position of operation in which the pressure accumulator is disconnected from the hydraulic pressure source but is maintained in full hydraulic connection with the fluid motor for power operating the brakes. In this second position of operation of the charging valve the hydraulic fluid pressure source is in full flow connection with the steering control valve.

In the hydraulic power system heretofore described, there is also provided a mechanism that is responsive to the hydraulic pressure in the accumulator that controls operation of the charging valve to move it between its two positions of operation so that the accumulator will be connected with the source of hydraulic fluid pressure only when the hydraulic pressure in the accumulator falls to or below a predetermined value and will disconnect the pressure accumulator from the source of hydraulic pressure fluid whenever the hydraulic pressure in the accumulator rises to or above a predetermined value.

The hydraulic system of this invention therefore provides for independence of the pressure system for power operation of the brakes, the brake system being operated solely as a result of maintenance of hydraulic pressure in the accumulator, and also provides for continuous circulation of hydraulic fluid to the steering control valve of the power mechanism for the steering mechanism of the vehicle irrespective of the need of the brake system for hydraulic fluid.

Further objects and advantages of the present invention will be apparent from the following description, reference being had to the accompanying drawings wherein a preferred form of the invention is clearly shown.

In the drawings:

Figure 3 is a cross sectional view taken along line 3—3 of Figure 2.

Figure 4 is a cross sectional view taken along line 4—4 of Figure 2.

Figure 1:
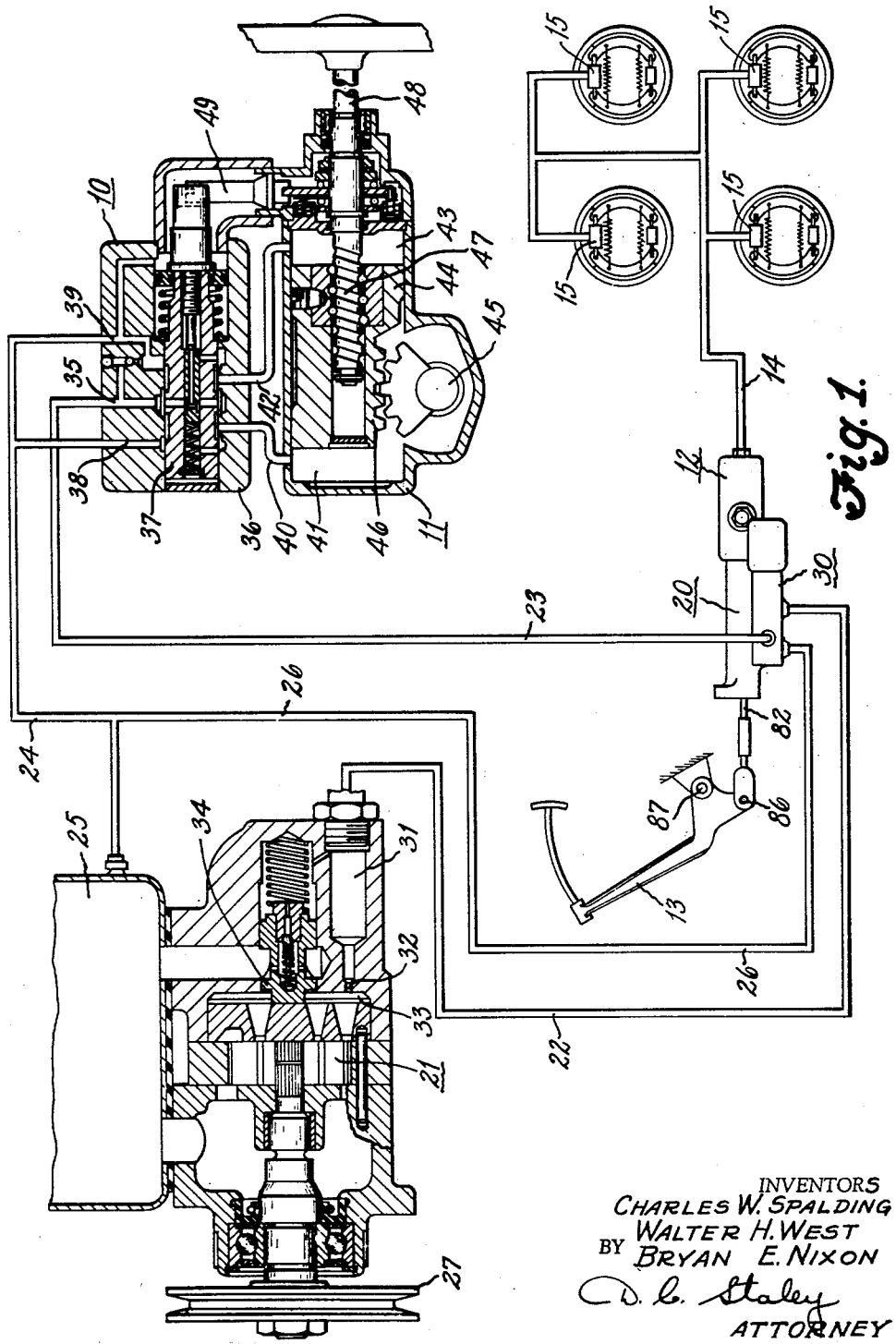
Figure 1 is a schematic illustration of the hydraulic system for power operation of the steering mechanism and of the brake mechanism of a vehicle that incorporates features of this invention.

In this invention the hydraulic power system consists of a steering control valve 10 that supplies hydraulic fluid under pressure to the steering control mechanism 11. A hydraulic master cylinder 12 is connected with the manually operated brake lever 13 in a manner hereinafter described to effect displacement of hydraulic fluid under pressure into the brake line 14 that connects with the wheel cylinders 15 of the hydraulically operated brakes of a motor vehicle. The brakes are of any conventional hydraulic type and are therefore neither further disclosed nor described.

The master cylinder 12 includes a fluid displacement piston 16 that is operated either manually by the brake lever 13 or by a hydraulic fluid motor 20 in a manner hereinafter described.

A hydraulic pump 21 provides a source of hydraulic fluid under pressure for delivery through the line 22 to an accumulator charging control valve 30, hereinafter described. The hydraulic fluid is delivered through the line 23 to the steering control valve 10 for supply of pressure fluid for operation of the steering mechanism 11. The steering control valve 10 is connected by way of a return line 24 to the reservoir 25 from which the pump 21 receives its hydraulic fluid. The hydraulic motor 20 that operates the displacement member 16 of the master cylinder 12 is connected by a line 26 with the line 24 and thence with the reservoir 25 for return of actuating fluid to the reservoir.

The pump 21 is adapted to be belt driven by the engine of the vehicle, a belt passing over a suitable pulley 27 so that whenever the engine is operating, the pump will be delivering hydraulic liquid under pressure into the line 22. The line 22 connects with a discharge port 31 that includes a restricted passage 32 by which the maximum volume of fluid deliverable into the line 31 is controlled, dependent upon the pressure in the pump discharge chamber 33. When the pump delivers fluid at a rate above the flow rate of the passage 32, excess fluid is discharged into the reservoir 25 through the control valve 34 which also maintains the pressure of the fluid in the discharge chamber 33 at a predetermined value. The pump 21, is therefore adapted to provide for continuous delivery of hydraulic fluid into the line 22 that can circulate through the control valve 30 and into the line 23 for delivery to the inlet port 35 of the steering control valve 10.

The steering control valve 10 consists of a valve body 36 that has a spool 37 reciprocable in the valve body. When the spool 37 is positioned as shown in Figure 1, hydraulic fluid from the inlet port 35 is deliverable into both exhaust or return ports 38 and 39 for return to the reservoir 25. The control valve 10 is thus of the type known as an open center valve. When the spool 37 is shifted in a right hand direction, the inlet passage 35 is connected with the line 40 that connects with one end 41 of a hydraulic motor provided in the steering mechanism 11. Similarly, when the valve spool 37 moves in a left hand direction the inlet line 35 is connected with the line 42 that connects with the chamber 43 at the opposite end of the hydraulic motor in the steering mechanism 11. The hydraulic motor formed by the chambers 41, 43 contains a piston 44 that is reciprocable in the chambers 41 and 43 to power drive the pinion shaft 45 of the steering mechanism through the rack 46.

The piston 44 is also movable manually through the ball screw and nut mechanism 47 wherein the screw is formed on the steering shaft 48 and the nut is contained in the piston 44. Axial reaction on the steering shaft 48 effects titlting of the lever 49 by which the spool 37 of the steering control valve 10 is reciprocated to effect selective delivery of liquid under pressure to either of the chambers 41 or 43, dependent upon direction of rotation of the steering shaft 48.

more or less conventional type and

The steering mechanism heretofore described is a more or less conventional type and is therefore not further disclosed nor described in detail.

The hydraulic power mechanism for operating the brakes of the vehicle consists of a hydraulic motor 50 that includes a cylinder bore 51 in which there is a reciprocable piston 52. The piston 52 divides the cylinder bore 51 into a pressure receiving chamber 53 and an exhaust chamber 54 so that when hydraulic fluid under pressure is present in chamber 53, the piston 52 will be moved in a right hand direction to cause the plunger 55 that engages the master cylinder displacement member 16 to move it in a right hand direction against the action of the spring 56 and thereby displace fluid under pressure from the master cylinder into the brake line 14 through the residual pressure check valve 57. The master cylinder 12 is of a more or less conventional type and is therefore not further described.

The piston 52 of the hydraulic motor 50 carries a seal member 58 at one end and the opposite end of the piston slides through a seal member 59 carried in the wall of the cylinder 51. The piston 52 is of smaller diameter than the cylinder 51 whereby to form an annular chamber 60 around the piston that is connected with the hydraulic fluid line 22 from the pump 21 in a manner hereinafter described.

The piston 52 of the hydraulic motor 50 has an internal sleeve member 61 that is formed with recesses 62 and 63, the recess 62 connecting with the annular pressure fluid chamber 60 through a port 65 while the recess 63 connects with the exhaust chamber 54 of the motor 50 through an annular recess chamber 66 in the piston 52.

The sleeve 61 has an axial bore 67 that receives a slide valve 70 that has an annular recess 71 and an axial bore 72. The recess 71 is connected with the axial bore 72 through a passage 73. A compression spring 74 normally holds the valve 70 against the stop 75 so as to place the recess 71 out of alignment with a port 76 that is provided to allow flow of hydraulic fluid from the recess 62 in the sleeve 61 into the recess 71 when the sleeve valve is moved in a right hand direction.

Figure 2:
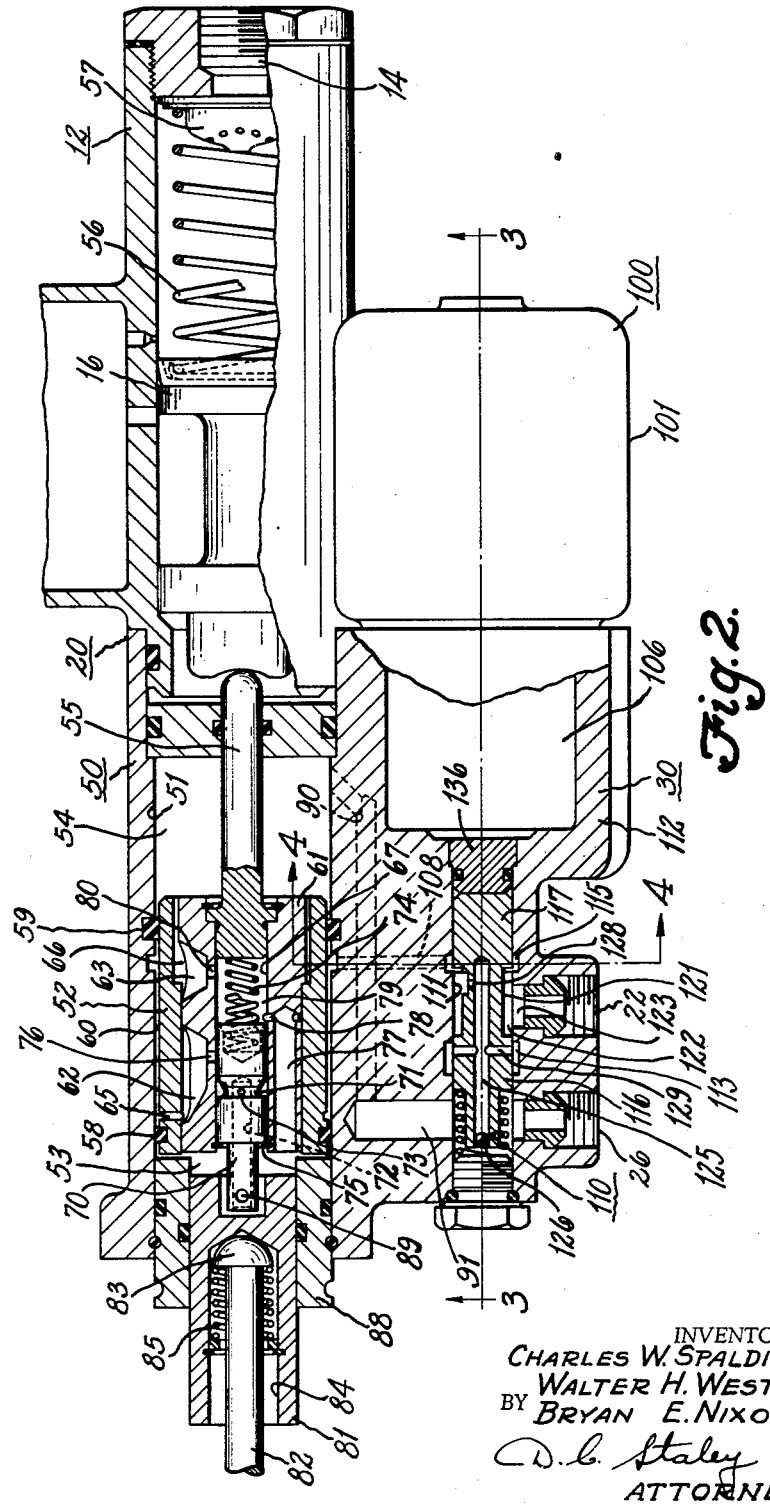
Figure 2 is a longitudinal cross sectional view of the brake control mechanism, this view including a cross section of an accumulator and charging valve for the accumulator and taken along line 2—2 of Figure 4.

With the sleeve valve 70 in the position illustrated in Figure 2, a passage 77 connects the pressure chamber 53 of the motor 50 with the exhaust chamber 54 through a port 78 and the spring chamber 79 connects with the recess 63 in the sleeve 61 by a port 80.

The sleeve valve 70 is connected with the actuating member 81 that in turn is connected with the brake lever 13 by way of an operating rod 82 that has the enlarged head 83 retained in the bore 84 of the member 81 by means of a compression spring 85. The opposite end of the rod 82 has a pivot connection 86 with the brake arm 13 that is provided with a pivot mounting 87 whereby movement of the brake arm 13 in a counter-clockwise direction about the pivot 87 will effect right hand movement of the rod 82. The actuating member 81 is slidable in a sleeve 88 that closes the left hand end of the chamber 53. The valve 70 is connected with the actuator 81 by means of a pin 89.

When the brake is to be applied, actuation of the brake lever 13 causes movement of the valve 70 in a right hand direction to first close the exhaust port 78 and thereby close off communication of chamber 53 with the exhaust chamber 54. Additional right hand movement of valve 70 will align the recess 71 with the port 76 to allow hydraulic fluid under pressure to be delivered from the annulus chamber 60 through the port 65 and the recess 62 into the port 76 and through the recess 71 into the port 73 that connects with the bore 72 for delivery of hydraulic liquid under pressure into the work chamber 53, thus advancing the piston 52 in a right hand direction with the result that the displacement member 16 and the master cylinder 12 is power operated for displacement of hydraulic fluid from the master cylinder.

When the brake is released and the valve 70 is moved in a left hand direction, as a result of movement of the brake arm 13 by a retraction spring (not shown) in a clockwise direction about the pivot 87, the valve member is repositioned as is shown in Figure 2 so that hydraulic fluid under pressure will discharge from the work chamber 53 into the exhaust chamber 54 through the passage 77, port 78, chamber 79, port 80, recess 63 and recess chamber 66 for return to the reservoir 25 through the passage 90 and the passage 91 that connects with the pipe 26.

Hydraulic pressure fluid for actuating the hydraulic motor 50, as herein described, is obtained from a hydraulic accumulator 100 that consists of a body 101 having a sleeve 102 in which there is placed a reciprocable piston 103. The piston 103 has an open ended chamber 104 that communicates with a chamber 105 provided between the sleeve 102 and the body 101. The chambers 104 and 105 are filled with a gaseous medium under pressure so that the piston 103 is normally at the left hand end of the accumulator chamber 106, rather than as positioned in Figure 3, until the chamber 106 is filled with hydraulic fluid that is held under pressure by the pressure of the gaseous medium in the chambers 104 and 105. The piston 103 will maintain hydraulic fluid under pressure in the chamber 106 until the piston bottoms on the left hand end of the chamber 106.

The accumulator chamber 106 is hydraulically connected with the annular chamber 60 around the power piston 52 of the fluid motor 50 by means of a passage 107 and a passage 108 provided in the body of the annular valve 30. Thus the accumulator chamber 106 is continuously in communication with the annular chamber 60 around the power piston 52 for supply of hydraulic fluid under pressure to the fluid motor 50 for power operation of the brakes irrespective of the conditions of operation of the accumulator charging valve 30, hereinafter described.

Hydraulic pressure in the accumulator 106 is maintained between a predetermined maximum and a predetermined minimum pressure under regulation of the charging control valve 30. The charging control valve consists of a spool valve member 110 that is slidable in a cylinder bore 111 provided in the body 112 of the valve 30.

The cylinder bore 111 has an annular recess 113 that is connected with an outlet port 114 with which the line 23 is connected which supplies hydraulic fluid under pressure to the steering control valve 10. The annular recess 113 encircles the enlarged land portion 116 of the valve 110. A second annular recess 115 is provided in the periphery of the cylinder bore 111 and is adapted to encircle the land portion 117 of the valve 110.

The annular recess 115 communicates with a passage 118 in the body of the valve 30 that has a closure element 119 in the end thereof. The passage 118 contains a check valve 120 that is adapted to open in the direction of the arrow placed thereon so that hydraulic fluid will flow from the recess 115 through the check valve 120 and into the passage 107 that communicates with the accumulator chamber 106, and also flow into the passage 108 that communicates with the annular chamber 60 around the work piston 52 of the fluid motor 50.

Between the lands 116 and 117 of the valve 110 there is provided a reduced diameter portion 121 thereby providing an annular chamber 122 between the land portions 116 and 117. The annular chamber 122 is connected by a port 123 with the pipe 22 that supplies hydraulic fluid under pressure from the pump 21 to the hydraulic system so that the chamber 122 forms the inlet pressure chamber from which hydraulic fluid is distributed to the accumulator chamber 106 through the passage 107 and to the steering control valve through the annular chamber 113.

The valve 110 has an axial bore 125 closed at one end by the closure element 126. A port or passage 128 connects the inlet chamber 122 with the bore 125 and passages 129 connect the bore 125 with the annular recess 113 whereby hydraulic fluid under pressure can flow from the inlet chamber 122 through the port 128 into the bore 125 and thence through the passages 129 into the annular chamber 113 for delivery to the pipe 23 to supply hydraulic fluid under pressure to the steering control valve 10. The port 128 is of such a size as to provide for less than full flow of hydraulic fluid from the pump 21 so that when the valve 110 is in the position illustrated in Figure 2 a portion of the hydraulic fluid in the inlet chamber 122 will pass through the port 128 in the manner just described and another portion of the hydraulic fluid will pass through the annular chamber 115 into the passage 108 and thence into the pressure accumulator 106 through the passage 107, the check valve opening in the direction of the arrow to allow fluid flow to the passage 107.

With the valve 110 in the position illustrated in Figure 2, hydraulic fluid under pressure will be delivered into the accumulator chamber 106 to move the piston 103 in a right hand direction against the gaseous pressure 105 of the accumulator. To control the maximum pressure in the accumulator chamber 106 there is provided a control element 130 (see Figure 3) that is spring urged in a right hand direction by means of the compression spring 131. The control element 130 is reciprocable in the bore 132 that is open to the pressure within the accumulator chamber 106 through the port 133. The land portion 134 is adapted to close the passage 135 that extends between the bore 132 and the bore 111 containing the valve 110, the passage 135 communicating with the bore 111 just to the right hand side of the land portion 117, as viewed in Figures 2 or 3. With no pressure in the accumulator chamber 106, the valve 110 is retained against the stop plug 136 by a compression spring 137.

The control element 130 is also provided with a reduced diameter portion 138 that is adapted to communicate with the passage 135 to permit exhaust of fluid from the bore 111 at the right hand end of the land portion 117, a bleed passage 139 being provided on the periphery of the control element 130 for this purpose, the fluid discharging into the spring chamber 140 and from there passing through the passage 141 that connects with the bore 111 at the left hand end of the land portion 116 that in turn communicates with the pipe 26 for return flow of hydraulic fluid to the reservoir 25 and pump 21.

In operation, assuming the hydraulic system is being started up for the first time, the valve 110 and the control element 130 of the charging valve 30 will be in the positions illustrated in Figures 2 and 3, but the piston 103 will be at the left hand end of the chamber 106 of the accumulator 100. When the pump 21 is driven by the engine and hydraulic fluid is delivered into the line 22 at a minimum controlled flow and a minimum controlled pressure, the hydraulic fluid will enter the inlet chamber 122 of the charging valve 30. From the inlet chamber 122 the hydraulic fluid will be distributed in two directions, one being a controlled flow of hydraulic fluid passing through the port 128 into the bore 125 and thence through the passage 129 into the chamber 113 for delivery into the line 23 to maintain a minimum controlled flow of hydraulic fluid through the steering control valve 10 that will be available for instantaneous use upon a call for hydraulic fluid under pressure to be delivered to either chamber 41 or 43 of the fluid motor of the steering control. The other direction of distribution of the hydraulic fluid from the chamber 122 will be through the annular chamber 115 into the passage 118 and thence through the check valve 120 into the passage 107 that directs hydraulic fluid under pressure into the accumulator chamber 106. Concurrently hydraulic fluid passes through the passage 108 into the annular chamber 60 of the fluid motor 50 for the brakes of the vehicle so that hydraulic fluid will be instantly available for the work chamber 53 of the fluid motor 50 as called for by operation of the valve 70 for application of the brakes in a manner heretofore described.

Hydraulic fluid under pressure will continue to be delivered into the accumulator chamber 106 to move the piston 103 against the gaseous charge 105 in the accumulator until such time as the hydraulic pressure in the chamber 106 reaches a value sufficient to move the control element 130 in a left hand direction against the action of the compression spring 131. When this occurs hydraulic fluid from the accumulator 106 will pass through the port 133 into the bore 132 and thence through the passage 135 into the bore 111 at the right hand end of the valve 110 to move the valve in a left hand direction against the action of the compression spring 137 until the edge 150 of the land portion 117 passes the left hand edge of the annular recess 115 to close off the recess and thereby effect discontinuance of flow of hydraulic fluid from the inlet chamber 122 into the accumulator chamber 106 through the passages heretofore established. Concurrently, the edge 151 of the land portion 116 will pass over the right hand edge of the recess 113 so that now full pump flow of hydraulic fluid can pass from the inlet chamber 122 directly into the annular recess 113 for delivery into the line 23 to fully and completely serve the steering control 10.

When the charging valve 30 has been operated as just described, the hydraulic pressure to operate the power piston 52 of the fluid motor 50 will be obtained solely from the accumulator chamber 106, the hydraulic pressure for the brake system now being completely isolated from the hydraulic pressure system for operating the steering control mechanism 11, and this situation will continue until the fluid motor 50 has been operated a sufficient number of times to cause the hydraulic pressure in the accumulator 106 to fall to a predetermined minimum pressure value.

When this occurs the control element 130 will have been moved by the compression spring 131 in a right hand direction until the land portion 134 moves to the right hand side of passage 135 to provide communication of the passage 135 with the annular chamber around the reduced diameter portion 138 of the control element 130 and thence through the bleed passage 139 and chamber 140 with the return or exhaust chamber 141 to allow the hydraulic fluid to exhaust from the chamber of the bore 111 at the right hand end of the land portion 117. When hydraulic fluid is exhausted from the chamber at the right hand end of the land 117, the valve 110 will be moved by the spring 137 in a right hand direction to again position the valve as shown in Figures 2 and 3 and again establish connection between the inlet chamber 122 and the accumulator chamber 106 to reestablish operating pressure in the accumulator chamber as heretofore described.

While the form of embodiment of the invention as herein disclosed constitutes a preferred form, it is to be understood that other forms might be adopted as may come within the scope of the claims which follow.

What is claimed is as follows:

1. In a hydraulic power system for operating a steering mechanism and assisting in the operation of vehicle brakes comprising in combination, a source of pressurized hydraulic fluid, a fluid motor for operating a steering mechanism, a hydraulic fluid actuating system for actuating vehicle brakes, a hydraulic fluid control unit including a master cylinder in communication with said hydraulic fluid actuating system, a hydraulic fluid motor for assisting in pressurizing fluid in said master cylinder, a manual control means for pressurizing fluid in said master cylinder and controlling the valve means in said hydraulic fluid brake motor, a hydraulic fluid accumulator, a fluid pressure inlet port in communication with said source of pressurized fluid, passage means connecting said inlet port with said accumulator and said hydraulic fluid brake motor, an accumulator valve means in said passage means biased to one position by resilient means permitting communication between said source of pressurized fluid and said accumulator and said fluid brake motor, a piston on said accumulator valve means in communication with said accumulator to bias said accumulator valve means to a closed position in response to a predetermined fluid pressure in said accumulator thereby preventing communication between said source of pressurized fluid, said accumulator and said brake fluid motor, an outlet port in communication with said fluid motor for operating said steering mechanism, passage means connecting said inlet port and said outlet port, a return port, conduit means connecting said hydraulic fluid brake motor with said return port, said control unit thereby providing constant communication between said source of pressurized fluid and said fluid steering motor and intermittent communication between said source of pressurized fluid and said accumulator and said hydraulic fluid brake motor in response to the pressure within said accumulator.

2. In a hydraulic power system for operating a steering mechanism and assisting in operation of vehicle brakes comprising in combination, a source of pressurized hydraulic fluid, a fluid motor for operating a steering mechanism, a fluid brake actuating system, a hydraulic fluid control unit including, a master cylinder in communication with said fluid brake actuating system, a hydraulic fluid brake motor for assisting in pressurizing fluid in said master cylinder, a manual means for pressurizing fluid in said master cylinder and controlling a valve means in said hydraulic fluid brake motor, a hydraulic fluid accumulator, an inlet port in said control unit in communication with said source of pressurized fluid, passage means connecting said inlet port with said accumulator and said fluid brake motor, an accumulator valve means in said passage means biased to an open position by resilient means to provide communication between said source of pressurized fluid and said accumulator, a second passage means connecting said accumulator to a piston on said accumulator valve through a control element to bias said accumulator valve to a closed position closing off communication between said source of pressurized fluid and said accumulator, an outlet port in communication with said fluid motor for said steering mechanism, conduit means connecting said inlet with said outlet port to provide continual communication between said source of pressurized fluid and said hydraulic fluid motor for operating said steering mechanism, a return port, passage means connecting said fluid brake motor with said outlet port to provide return of fluid from said hydraulic fluid brake motor.

3. In a hydraulic fluid power system for operating a steering mechanism and assisting in the operation of the vehicle brakes comprising in combination, a source of pressurized hydraulic fluid, fluid motor for operating a steering mechanism, a fluid brake actuating system for actuating vehicle brakes, a hydraulic fluid control unit including, a master cylinder in communication with said fluid brake actuating system, hydraulic fluid motor for assisting in pressurizing fluid in said master cylinder, manual means for pressurizing fluid in said master cylinder and controlling a motor control valve means in said hydraulic fluid brake motor, a hydraulic fluid accumulator, an inlet port in communication with said source of pressurized fluid, passage means connecting said inlet port with said accumulator and said fluid motor for operating said vehicle brakes, an accumulator control valve in said passage means connecting said inlet port with said accumulator, said accumulator valve biased to an open position by resilient means to provide communication between said inlet port and said accumulator, a piston means formed on said accumulator valve, passage means connecting said piston means on said accumulator valve with said accumulator, a control element in said passage means connecting said accumulator with said piston on said accumulator valve for permitting communication between said accumulator and said accumulator valve when a predetermined pressure exists in said accumulator upon which said control element opens to permit a biasing force of the pressure of said accumulator for closing said accumulator valve and blocking communication between said accumulator and said inlet port, a fluid return port, passage means connecting said fluid brake motor with said return port, an outlet port connected to said fluid motor for operating said steering mechanism, passage means connecting said inlet port with said outlet port to provide communication between said source of pressurized fluid and said fluid motor for operating said steering mechanism at all times.

4. In a hydraulic fluid power system for operating a steering mechanism and assisting in the operation of vehicle brakes comprising in combination, a source of pressurized hydraulic fluid, a fluid motor for operating steering mechanism, a fluid brake actuating system for actuating vehicle brakes, a hydraulic fluid control unit including, a master cylinder in communication with said fluid brake actuating system, a hydraulic fluid brake motor for assisting the pressurizing fluid in master cylinder, manual means for pressurizing fluid in said master cylinder and controlling a valve means in said hydraulic fluid brake motor, a hydraulic fluid accumulator, an inlet port in said control unit connected to said source of pressurized fluid, passage means connecting said inlet port connected with said accumulator and said hydraulic fluid brake motor, an accumulator valve in said passage means, said accumulator valve biased to an open position by resilient means, a connecting passage connecting a piston portion on said accumulator valve to said accumulator, a control element placed in said connecting passage from said piston portion of said accumulator valve to said accumulator, said control element operating in response to the pressure in said accumulator for permitting communication between said accumulator and said piston portion of said accumulator valve thereby biasing said accumulator valve to a closed position and preventing communication between said source of pressurized fluid and said accumulator, an outlet port in communication with the fluid motor for operating said steering mechanism, passage means connecting said inlet port with said outlet port thereby providing constant communication between said source of pressurized fluid and said steering motor, a return port, passage means connecting said hydraulic fluid brake motor with said return port, said control unit thereby providing constant communication for operation of said steering motor and intermittent communication between said accumulator and said hydraulic fluid brake motor in response to the pressure in said accumulator.

5. In a hydraulic power system for operating steering mechanism and assisting in the operation of vehicle brakes comprising in combination, a source of pressurized hydraulic fluid, a fluid motor for operating a steering mechanism, a fluid brake actuating system for actuating the vehicle brakes, a hydraulic fluid control unit including, a master cylinder in communication with said fluid brake actuating system, a hydraulic fluid brake motor for assisting in pressurizing fluid in said master cylinder, manual means for pressurizing fluid in said master cylinder and controlling a valve means in said hydraulic fluid brake motor, a hydraulic fluid accumulator comprising, a piston operating in said accumulator defining a gaseous fluid chamber and a hydraulic fluid chamber, said gaseous fluid chamber operating as a pressurizing medium for said accumulator, an inlet port in said control unit in communication with said source of pressurized fluid, a passage means connecting said inlet port with said hydraulic fluid brake motor and said hydraulic fluid chamber of said accumulator, an accumulator valve in said passage means connecting said accumulator with said inlet port biased to a normally open position by resilient means, a second passage means connecting said hydraulic fluid chamber of said accumulator with a piston portion on said accumulator valve and receiving a control element, said control element operating in response to pressure in said accumulator thereby providing communication between said accumulator and said piston portion of said accumulator valve when a predetermined pressure exists in said accumulator thereby biasing said accumulator valve to a closed position preventing communication between said accumulator and said inlet port, an outlet port in communication with said fluid motor for actuating said steering mechanism, passage means connecting said inlet port with said outlet port thereby providing continual communication between said inlet port and said steering mechanism, a return port, passage means connecting said hydraulic fluid brake motor with said return port to provide return of hydraulic fluid to said source of pressurized fluid, said control unit thereby providing constant communication between said source of pressurized fluid and said fluid motor for operating said steering mechanism and intermittent communication between said source of pressurized fluid and said accumulator and said hydraulic fluid brake motor in response to the pressure in said accumulator.

References Cited in the file of this patent

UNITED STATES PATENTS

| | | |
|---|---|---|
| 1,365,347 | Schneider | Jan. 11, 1921 |
| 2,451,334 | Groves | Oct. 12, 1948 |
| 2,559,065 | Dewandre | July 3, 1951 |
| 2,674,092 | Gardiner | Apr. 6, 1954 |
| 2,799,996 | Van Meter | July 23, 1957 |
| 2,818,711 | Lincoln et al. | Jan. 7, 1958 |
| 2,846,850 | Hall | Aug. 12, 1958 |
| 2,850,878 | Sampietro et al. | Sept. 9, 1958 |
| 2,850,879 | Schnabel | Sept. 9, 1958 |